US009814096B2

(12) United States Patent
Brudevold

(10) Patent No.: US 9,814,096 B2
(45) Date of Patent: Nov. 7, 2017

(54) POWER MANAGEMENT FOR HOT MELT DISPENSING SYSTEMS

(71) Applicant: Graco Minnesota Inc., Minneapolis, MN (US)

(72) Inventor: Mark J. Brudevold, Fridley, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 275 days.

(21) Appl. No.: 14/728,746

(22) Filed: Jun. 2, 2015

(65) Prior Publication Data

US 2015/0264745 A1 Sep. 17, 2015

Related U.S. Application Data

(62) Division of application No. 13/705,406, filed on Dec. 5, 2012, now Pat. No. 9,119,230.

(60) Provisional application No. 61/718,235, filed on Oct. 25, 2012.

(51) Int. Cl.

| | |
|---|---|
| ***B67B 7/00*** | (2006.01) |
| ***G01F 11/00*** | (2006.01) |
| ***B67D 1/00*** | (2006.01) |
| ***B67D 7/14*** | (2010.01) |
| ***B67D 7/80*** | (2010.01) |
| ***H05B 1/02*** | (2006.01) |
| ***B67D 99/00*** | (2010.01) |

(52) U.S. Cl.

CPC .......... *H05B 1/0225* (2013.01); *B67D 99/00* (2013.01); *H05B 1/0244* (2013.01)

(58) Field of Classification Search

CPC ................................ H05B 1/02; H05B 1/0244
USPC ............... 222/1, 52, 54, 146.1, 146.2, 146.5
See application file for complete search history.

(56) References Cited

U.S. PATENT DOCUMENTS

| | | | |
|---|---|---|---|
| 5,074,952 | A | 12/1991 | Zavracky et al. |
| 7,109,440 | B2 | 9/2006 | Lee |
| 2002/0027131 | A1 | 3/2002 | Kitada |
| 2005/0103770 | A1 | 5/2005 | Lee |
| 2006/0081719 | A1 | 4/2006 | Nguyen |
| 2006/0289566 | A1 | 12/2006 | Heerdt et al. |

FOREIGN PATENT DOCUMENTS

KR 10-2005-0047341 A 5/2005

OTHER PUBLICATIONS

International Search Report and Written Opinion of PCT Application Serial No. PCT/US2012/067856, dated Jul. 23, 2013, 9 pages.

*Primary Examiner* — Vishal Pancholi
(74) *Attorney, Agent, or Firm* — Kinney & Lange, P.A.

(57) ABSTRACT

A method of controlling heating of hot melt adhesive within a hot melt dispensing system includes receiving input AC electric power, determining on a half cycle-by-half cycle basis which heaters in a plurality of zones will receive AC electric power during the next half cycle, and distributing the AC electric power to the heaters on a time sharing basis.

18 Claims, 3 Drawing Sheets

POWER MANAGEMENT FOR HOT MELT DISPENSING SYSTEMS

CROSS-REFERENCE TO RELATED APPLICATION(S)

This application is a divisional of U.S. application Ser. No. 13/705,406 filed Dec. 5, 2012, for "Power Management for Hot Melt Dispensing Systems" by Mark J. Brudevold, which in turn claims the benefit of U.S. Provisional Application No. 61/718,235 filed Oct. 25, 2012, for "Power Management for Hot Melt Dispensing Sytems" by Mark J. Brudevold.

BACKGROUND

The present disclosure relates generally to systems for dispensing hot melt adhesive. More particularly, the present disclosure relates to electric power management for hot melt dispensing systems.

Hot melt dispensing systems are typically used in manufacturing assembly lines to automatically disperse an adhesive used in the construction of packaging materials such as boxes, cartons and the like. Hot melt dispensing systems conventionally comprise a material tank, heating elements, a pump and a dispenser. Solid polymer pellets are melted in the tank using a heating element before being supplied to the dispenser by the pump. Because the melted pellets will re-solidify into solid form if permitted to cool, the melted pellets must be maintained at temperature from the tank to the dispenser. This typically requires placement of heating elements in the tank, the pump and the dispenser, as well as heating any tubing or hoses that connect those components. Furthermore, conventional hot melt dispensing systems typically utilize tanks having large volumes so that extended periods of dispensing can occur after the pellets contained therein are melted. However, the large volume of pellets within the tank requires a lengthy period of time to completely melt, which increases start-up times for the system. For example, a typical tank includes a plurality of heating elements lining the walls of a rectangular, gravity-fed tank such that melted pellets along the walls prevents the heating elements from efficiently melting pellets in the center of the container. The extended time required to melt the pellets in these tanks increases the likelihood of "charring" or darkening of the adhesive due to prolonged heat exposure.

SUMMARY

According to the present invention, a method of controlling heating of hot melt adhesive within a hot melt dispensing system includes receiving input AC electric power, determining on a half cycle-by-half cycle basis which heaters in a plurality of zones will receive AC electric power during the next half cycle, and distributing the AC electric power to the heaters on a time sharing basis.

In another embodiment, a method of controlling heating of hot melt adhesive within a hot melt dispensing system includes receiving input AC electric power, determining AC electric power distribution for each next half cycle, and distributing the power to heaters in a plurality of zones on a timesharing basis. The distribution of electric power is a function of a total current target, a temperature set point, current draw of each of the heaters, and stored priority criteria.

In yet another embodiment, a method of controlling heating of hot melt adhesive within a hot melt dispensing system includes receiving input AC electric power, distributing the AC electric power to heaters in a plurality of zones on a time sharing basis, maintaining an RMS total current draw over time at or below the total current target, and limiting the total current draw during each half cycle to less than a circuit breaker current limit.

DETAILED DESCRIPTION

Figure 1:
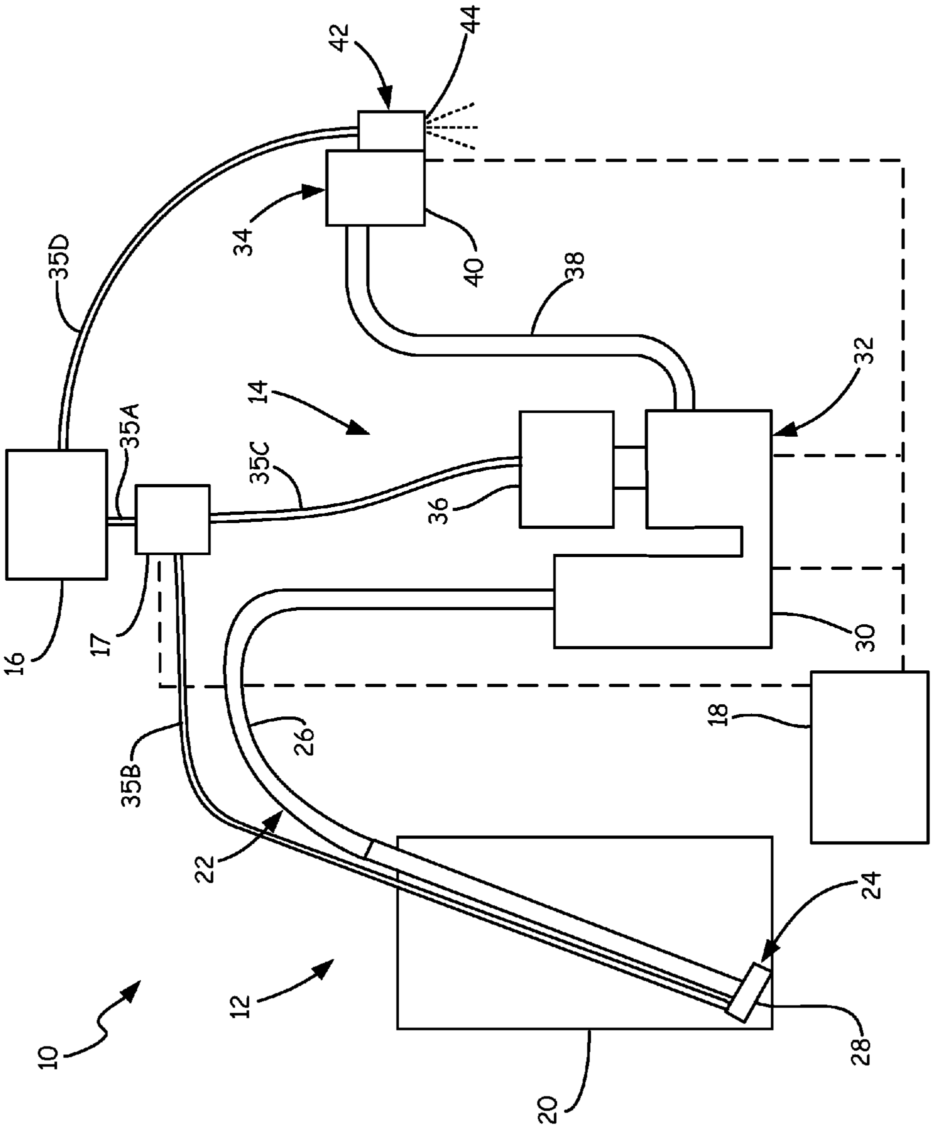
FIG. 1 is a schematic view of a system for dispensing hot melt adhesive.

FIG. 1 is a schematic view of system 10, which is a system for dispensing hot melt adhesive. System 10 includes cold section 12, hot section 14, air source 16, air control valve 17, and controller 18. In the embodiment shown in FIG. 1, cold section 12 includes container 20 and feed assembly 22, which includes vacuum assembly 24, feed hose 26, and inlet 28. In the embodiment shown in FIG. 1, hot section 14 includes melt system 30, pump 32, and dispenser 34. Air source 16 is a source of compressed air supplied to components of system 10 in both cold section 12 and hot section 14. Air control valve 17 is connected to air source 16 via air hose 35A, and selectively controls air flow from air source 16 through air hose 35B to vacuum assembly 24 and through air hose 35C to motor 36 of pump 32. Air hose 35D connects air source 16 to dispenser 34, bypassing air control valve 17. Controller 18 is connected in communication with various components of system 10, such as air control valve 17, melt system 30, pump 32, and/or dispenser 34, for controlling operation of system 10.

Components of cold section 12 can be operated at room temperature, without being heated. Container 20 can be a hopper for containing a quantity of solid adhesive pellets for use by system 10. Suitable adhesives can include, for example, a thermoplastic polymer glue such as ethylene vinyl acetate (EVA) or metallocene. Feed assembly 22 connects container 20 to hot section 14 for delivering the solid adhesive pellets from container 20 to hot section 14. Feed assembly 22 includes vacuum assembly 24 and feed hose 26. Vacuum assembly 24 is positioned in container 20. Compressed air from air source 16 and air control valve 17 is delivered to vacuum assembly 24 to create a vacuum, inducing flow of solid adhesive pellets into inlet 28 of vacuum assembly 24 and then through feed hose 26 to hot section 14. Feed hose 26 is a tube or other passage sized with a diameter substantially larger than that of the solid adhesive pellets to allow the solid adhesive pellets to flow freely through feed hose 26. Feed hose 26 connects vacuum assembly 24 to hot section 14.

Solid adhesive pellets are delivered from feed hose 26 to melt system 30. Melt system 30 can include a container (not shown) and resistive heating elements (not shown) for melting the solid adhesive pellets to form a hot melt adhesive in liquid form. Melt system 30 can be sized to have a relatively small adhesive volume, for example about 0.5 liters, and configured to melt solid adhesive pellets in a relatively short period of time. Pump 32 is driven by motor 36 to pump hot melt adhesive from melt system 30, through supply hose 38, to dispenser 34. Motor 36 can be an air motor driven by pulses of compressed air from air source 16 and air control valve 17. Pump 32 can be a linear displacement pump driven by motor 36. In the illustrated embodiment, dispenser 34 includes manifold 40 and module 42. Hot melt adhesive from pump 32 is received in manifold 40 and dispensed via module 42. Dispenser 34 can selectively discharge hot melt adhesive whereby the hot melt adhesive is sprayed out outlet 44 of module 42 onto an object, such as a package, a case, or another object benefiting from hot melt adhesive dispensed by system 10. Module 42 can be one of multiple modules that are part of dispenser 34. In an alternative embodiment, dispenser 34 can have a different configuration, such as a handheld gun-type dispenser. Some or all of the components in hot section 14, including melt system 30, pump 32, supply hose 38, and dispenser 34, can be heated to keep the hot melt adhesive in a liquid state throughout hot section 14 during the dispensing process.

System 10 can be part of an industrial process, for example, for packaging and sealing cardboard packages and/or cases of packages. In alternative embodiments, system 10 can be modified as necessary for a particular industrial process application. For example, in one embodiment (not shown), pump 32 can be separated from melt system 30 and instead attached to dispenser 34. Supply hose 38 can then connect melt system 30 to pump 32.

Figure 2:
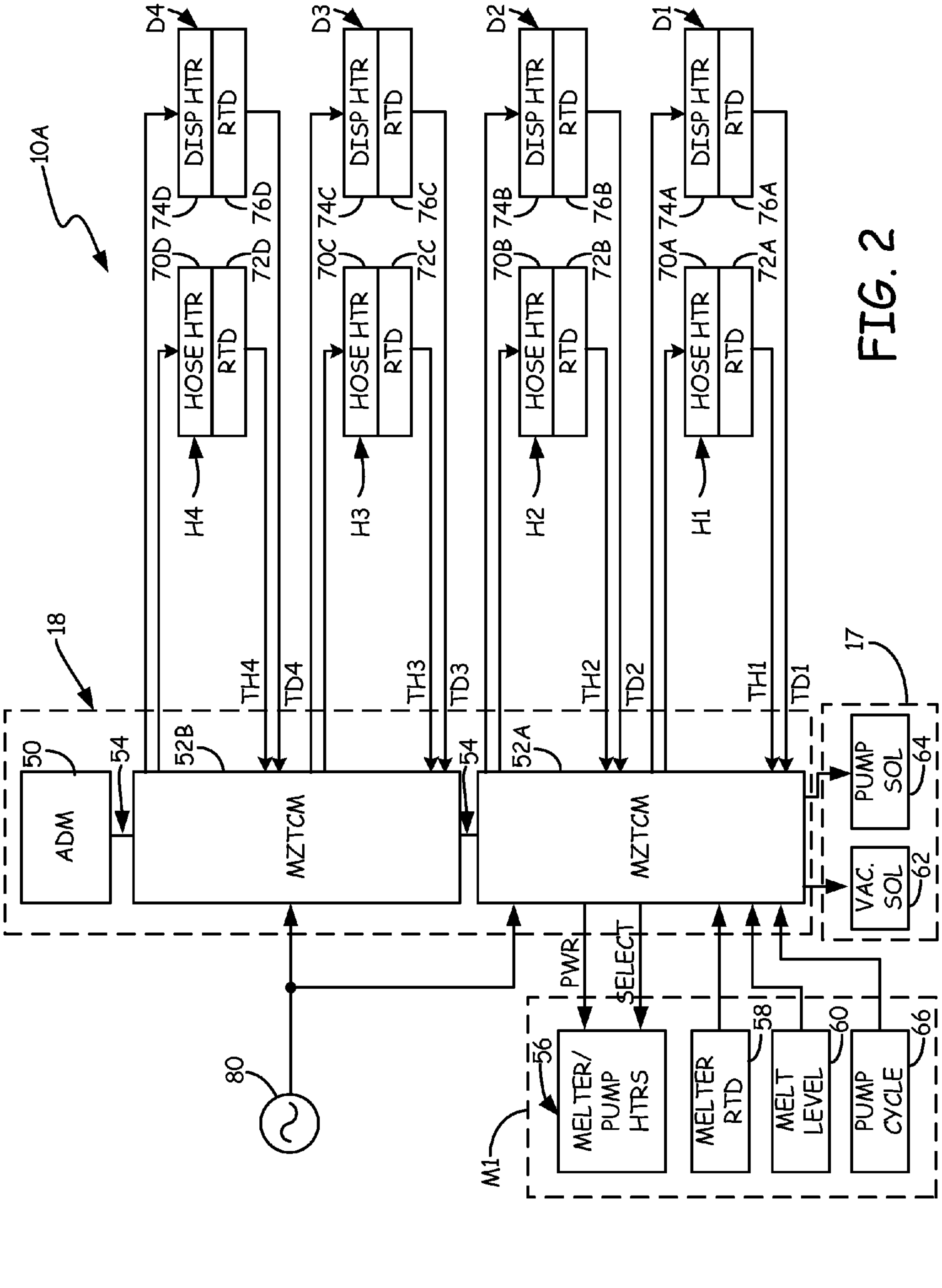
FIG. 2 is a block diagram showing a controller of a hot melt system similar to FIG. 1, including four hoses and four dispensers fed by a melter and pump.

In the embodiment shown in FIG. 1, a single hose 38 and dispenser 34 are shown as being fed by melt system 30 and dispenser 32. In other embodiments, multiple dispensers and hoses can be fed from a single melter and pump. FIG. 2 shows system 10A, which is similar to system 10 of FIG. 1, except that it includes four hoses H1-H4 and four associated dispensers D1-D4. In this embodiment, controller 18 controls the overall operation of system 10A, including the distribution of electrical power to all of the heaters used in the hot section of system 10A. The distribution of power is performed on a time sharing basis so that all of the heaters receive a share of the power, but the total current draw does not exceed a total current target that is consistent with the electrical power service available to system 10A.

FIG. 2 is a block diagram of hot melt system 10A, which is similar to system 10 of FIG. 1, except that system 10A is configured to operate with multiple hoses and dispensers. FIG. 2 shows controller 18, which includes advanced display module (ADM) 50, multi-zone temperature control modules (MZTCM) 52A and 52B, and CAN network 54, melter and pump heaters 56, melter resistance temperature detector (RTD) 58, melt level sensor 60, vacuum solenoid 62, pump solenoid 64, pump cycle switch 66, hoses H1-H4, and dispensers D1-D4. Hoses H1-H4 include hose heaters 70A-70D and RTDs 72A-72D, respectively. Similarly, dispensers D1-D4 include dispenser heaters 74A-74D and RTDs 76A-76D, respectively.

System 10A is considered to have nine different heating zones containing one or more heaters: four zones represented by hoses H1-H4, four zones represented by dispensers D1-D4, and zone M1 represented by melt system 30 and pump 32. In this particular embodiment, melter and pump heaters 56 are considered as a single zone, although multiple heaters are used. In one embodiment, melt system 30 includes three heaters (a band heater around an outer surface of melt system 30, a core heater in the center of melt system 30, and a base heater located in a base of melt system 30). In that same embodiment, a single heater may be used for pump 32. The grouping of heaters in zone M1 that receive power can be changed based upon a select signal from module 52A. This allows one grouping for warm up and another grouping for normal run time operation.

Controller 18 distributes electrical power from power source 80 to heaters in the nine zones. This distribution of power is done on a time sharing basis, because the current draws of all of the heaters combined exceeds the current available from power source 80.

System 10A will typically be used in a factory or manufacturing facility which will have AC electrical power available. The particular electric service may vary from facility to facility, and may also vary within the same facility. For example, the alternating current (AC) power may be single phase, three phase delta, or three phase wye with a neutral line. The AC voltages available may be, for example, 230 volt single phase, 230 volt three phase, or 400 volt three phase. In some cases, the nominal voltage may not be 230 volts, but instead may be a lower voltage such as 208 volts.

Power source 80 includes over-current protection provided by a circuit breaker (not shown). Examples of circuit breaker limits are 20 amps, 30 amps, 40 amps, and 50 amps. The varying voltages, phases, and current limits of available electric power present challenges to implementation of hot melt systems such as systems 10 and 10A shown in FIGS. 1 and 2.

In the embodiment shown in FIG. 2, controller 18 includes two multi zone temperature control modules 52A and 52B. Module 52A controls distribution of AC power on a time sharing basis among the zones represented by hoses H1 and H2, dispensers D1 and D2, and the zone M1 represented by melt system 30 and pump 32. Module 52B is responsible for distribution of power to the zones represented by hoses H3 and H4 and dispensers D3 and D4.

Module 52A also controls operation of melt system 30 and pump 32 together with cold section 12 (shown in FIG. 1), which includes container 20, and feed assembly 22 formed by vacuum assembly 24, feed hose 26, and inlet 28. Module 52A determines when to request replenishment of pellets in melt system 30 based upon melt levels within melt system 30 sensed by melt level sensor 60 or pump cycles of pump 32 sensed by pump cycle switch 66, or both. Module 52A controls the supply of air used by feed assembly 22 through vacuum solenoid 62 and controls operation of air motor 36 (which drives pump 32) through pump solenoid 64. Vacuum solenoid 62 and pump solenoid 64 form a part of air control valve 17 shown in FIG. 1.

Display module 50 and modules 52A and 52B communicate with one another over CAN network 54. Display module 50 acts as a user interface for system 10A. It includes a display for displaying instructions and information and a power button for turning system 10A on or off. User may enter setup information used by modules 52A and 52B through display module 50. The entry of information may be provided through a touch screen display or by input keys.

During initial setup, a user is prompted to provide information that will be used by controller 18 to control distribution of power to heaters within the different zones. This information will include voltage supply type and amperage limit (i.e., the circuit breaker current limit). It may also include a temperature set point for the system, which is a temperature at which the hot melt adhesive should be maintained.

Modules 52A and 52B will store other information to be used in determining the distribution of electric power among the heaters. For example, stored priority criteria may be stored for use by modules 52A and 52B in determining the selection of which heaters will receive power during a particular half cycle of electric power. These priority criteria may indicate a particular priority in which the zones must heat up during a warm up period before normal run time of system 10A begins. That particular priority may change once the system is entirely up to temperature and system 10A has entered a normal run time mode. Another priority criteria may be based on a history of on and off periods for each heater. For example, priority may be given to a heater if it has not been turned on for a certain number of half cycles, or it has only been turned on for a certain percentage of half cycles over a period of time.

Another priority criteria may be used to apply more power on periods (i.e., a larger duty cycle) to heaters that are further from a temperature set point. The determination of distance from the current set point is made by monitoring the temperature sensors (RTDs 58, 72A-72D, and 76A-76D) associated with the different zones.

Modules 52A and 52B use current sensors to detect zero crossings of the electrical power. This zero cross detection is used to synchronize the firing of triacs that control delivery of AC power to the individual heaters. The heaters are turned on for one half cycle at a time, and the selection of heaters that will receive power during the next half cycle is determined on a half cycle-by-half cycle basis. In other words, the loads (heaters) are fired strategically by modules 52A and 52B to balance average current draw over multiple half cycles and to limit total current draw during each half cycle of the sine waves of the electric power. This provides improved power factor and allows more power to the output for the same level of amperage. The determination of which loads (heaters) will be fired (turned on) each half cycle is calculated on the fly by modules 52A and 52B. Thus the time sharing of electric power is more accurate and more stable than a system relying only on feedback. This calculation depends on the current draw for each heater zone. Automatic calibration of heater zone current draw is performed regularly by modules 52A and 52B. The heater current profile is captured during regular operation. Each individual heater is run by itself (without the other heaters turned on) for a short period of time to allow 52A, 52B to measure the current draw for that heater. This can be done in a very short period of time—all of the heaters can be checked for their current draw within less than one half second. The heater current draw calibration can be performed at power up of system 10, and then repeated periodically (e.g., once a minute) thereafter. Modules 52A and 52B may also perform an automatic zero point calibration of RMS current. This can be performed on power up and also during gaps in heating (i.e., a half cycle when none of the zones are turned on). This automatic calibration of RMS current ensures that current draw is being accurately monitored during each half cycle.

In one operating mode, during each half cycle, a different zone is given first priority according to a rotating queue. This allows all zones an opportunity to share in the power that is being distributed. Zones are selected to be switched on based on their current draws until a calculated threshold has been reached; then the threshold for the next cycle is adjusted to insure exact control of amperage. In other words, the total current draw in one half cycle can be slightly above a desired average RMS (root mean square) current if a subsequent half cycle has total current draw that is below the average by a similar amount.

The calculations can be made for any configuration of hoses and dispensers. Depending on the connections made to modules 52A and 52B, a determination can be made by controller 18 of the configuration being used. Adjustments can be made in real time to changes in the line voltage as well as changes in the heater loads that are presented.

Table 1 shows an example implementation which involves only the five zones served by module 52A. In Table 1, five half cycles are shown with X's shown in each cycle for the particular heaters that are turned on. The example shown in Table 1 is an embodiment in which a 20 amp circuit breaker is present. As a result, an average current draw of 16 amps RMS (root mean square) is the target. In this example, the heaters of zone M1 have a 15 amp current draw; each zone H1-H4 has a 5.6 amp current draw; and each zone D1-D4 has a current draw of 1.8 amps. As can be seen in Table 1, total current draw in individual half cycles can be above 16 amps RMS, as long as the average over time is 16 amps RMS.

TABLE 1

| Half Cycle | 1 | 2 | 3 | 4 | 5 |
|---|---|---|---|---|---|
| Zone | — | — | — | — | — |
| M1 | X | | | X | |
| D1 | X | X | X | X | X |
| H1 | | X | X | | X |
| D2 | | X | X | X | X |
| H2 | | X | X | | X |
| Total (amps) | 16.8 | 14.8 | 14.8 | 18.6 | 14.8 |

In this example, for half cycle 1 zone M1 (melter and pump heaters 56) is given first priority for power, with the remaining queue of zones being D1, H1, D2, and H2 in that order. In half cycle 1, the current draw (15 amps) of melter/pump heaters 56 plus the current draw (1.8 amps) of dispenser heater 74A of D1 totals 16.8 amps, which exceed the 16 amp average target. As a result, heaters in H1, D1, and H2 zones are not turned on.

For half cycle 2, priority shifts to the next zone (D1) in the rotating queue. The total current draw of heaters in zones D1, H1, D2, and H2 totals 14.8 amps. If the 15 amp current draw of zone M1 were added, the total current draw would be too high, and therefore heaters 56 of zone M1 are off in half cycle 2.

In half cycle 3, the priority in the queue starts with zone H1. H1 can be turned on, together with D2 and H2 without exceeding the 20 amp limit. Those three zones, however, cannot be turned on together with melter/pump heaters 56, and therefore zone M1 is again skipped in half cycle 3. Zone D4 can be added without exceeding the current limit. The selection of zones in half cycle 3, therefore, is the same as half cycle 2.

In half cycle 4, the priority in the queue starts with zone D2. In this case, D2 plus melter/pump heaters 56, plus D1 are turned on. Melter/pump heaters 56 must be turned on at a certain frequency in order to maintain proper melting of the hot melt pellets in melt system 30, which explains why zone M1 is turned on in half cycle 4.

In half cycle 5, the priority starts with zone H2. Melter/pump heaters 56 would again cause too large a current draw if zone M1 turned on in conjunction with heater 70B in zone H2. All of the remaining zones D1, H1, and D2 can be turned on with zone H2, as shown in Table 1.

After five half cycles, the average current draw is just under 16 amps RMS, even though half cycles when zone M1 (melter/pump heaters 56) was turned on exceeded 16 amps. The power factor during this period was 0.995. By maintaining the power factor close to 1, highest efficiency in the use of power is achieved.

Table 2 shows another example in which all nine zones illustrated in FIG. 2 are in use. In this example, a 30 amp breaker is present, and therefore the average current draw needed is 24 amps RMS. The same current draws assumed for the example shown in Table 1 are again used in the Table 2 example.

TABLE 2

| Half Cycle | 1 | 2 | 3 | 4 | 5 | 6 | 7 | 8 |
|---|---|---|---|---|---|---|---|---|
| Zone | — | — | — | — | — | — | — | — |
| M1 | X | X | X | | X | X | X | |
| D1 | | | X | | | | X | |
| H1 | X | | | X | X | | | X |
| D2 | | | X | | | | X | |
| H2 | | X | | X | | X | | X |
| D3 | | | | | | | X | |
| H3 | X | | | X | X | | | X |
| D4 | | | X | | | | | |
| H4 | | X | | X | | X | | X |
| Total (amps) | 26.2 | 26.2 | 20.4 | 22.4 | 26.2 | 26.2 | 20.4 | 22.4 |

In this example, amperage is distributed using a prioritization scheme that provides more duty cycles to heaters that are further from the temperature set point. This balancing mechanism provides a more efficient warm up because full current can be used for greater time portion, resulting in faster heating times. Increased amounts of power can be provided to heaters with a greater need during heating (warm up) or normal run time. This also recognizes that different zones heat up from room temperature to the temperature set point at different rates. For example, dispenser zones D1-D4 heat up faster than hose zones H1-H4. Zone M1 takes the longest time to reach the temperature set point, and therefore requires highest priority in order to get system 10A through the warm up period in the shortest time.

Stability can be achieved by throttling the power share mode. For example, two different modes with different priority criteria can be used: a temperature independent mode using rotating queue priority and a temperature dependent mode using priority based on distance from the temperature set point.

In the example shown in Table 2, the temperature in zone M1 has fallen behind, while the dispenser zones D1-D4 are ahead of the hose zones H1-H4. As a result, M1 gets higher priority.

Another consideration in the power sharing is to balance the time sharing so that half cycles that are at current draws above the target are followed by half cycles that are below the target. In Table 2, for example, half cycles 1 and 2 are above the target, while half cycles 3 and 4 are below. Similarly half cycles 5 and 6 are above the current target and half cycles 7 and 8 are below. This is an additional priority criteria that insures that the average current will not drift over time to an average that exceeds the target.

Figure 3:
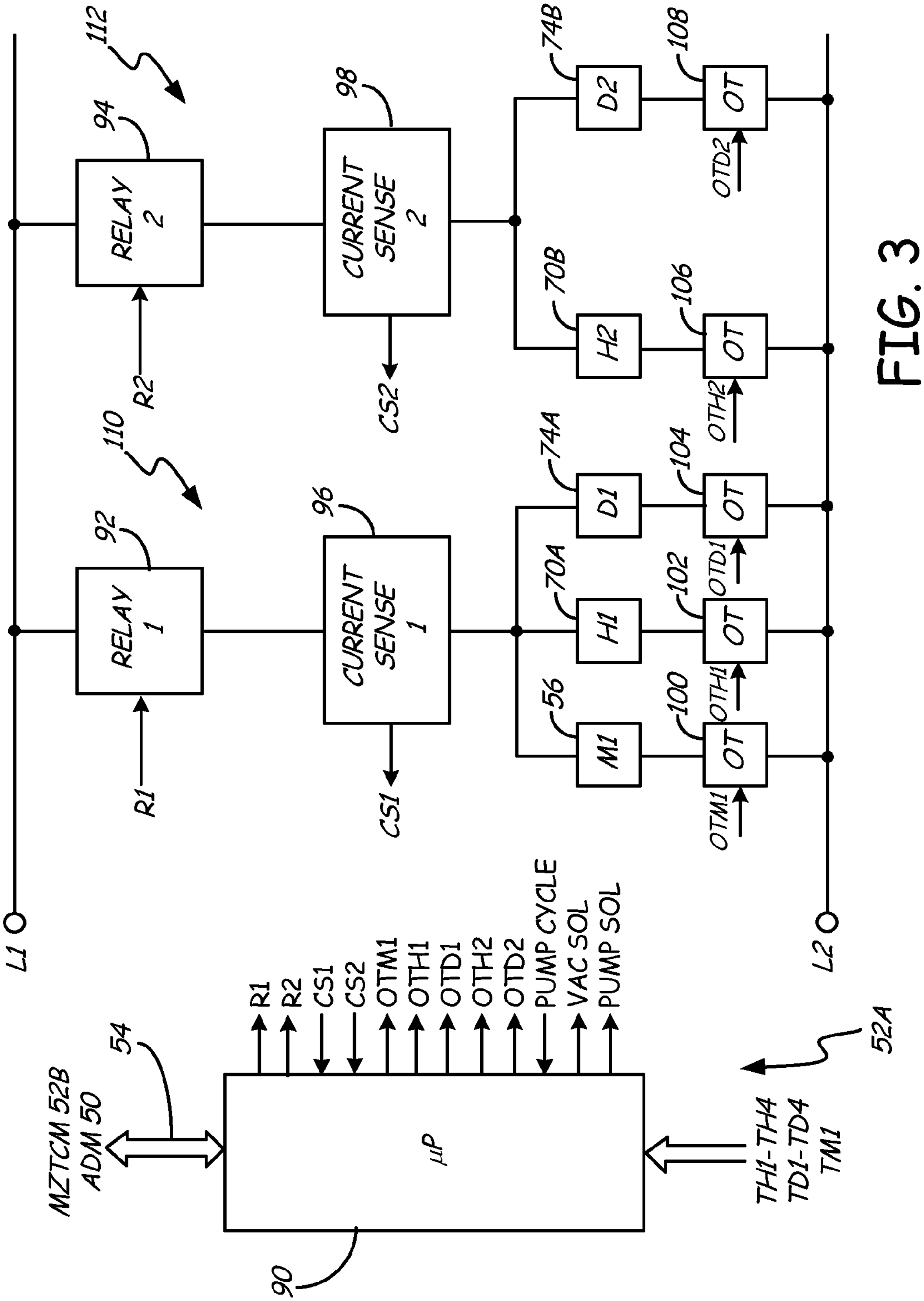
FIG. 3 is a block diagram illustrating circuitry of a multi-zone temperature control module of the controller of FIG. 2.

FIG. 3 is a schematic diagram showing module 52A. FIG. 3 shows how distribution of power to melt/pump heaters 56 of zone M1 and to heaters in zones H1, D1, H2, and D2 are controlled.

FIG. 3 shows microprocessor 90, which controls the operation of module 52A. Also shown are power lines L1 and L2, relays 92 and 94, current sensors 96 and 98, optical triacs 100, 102, 104, 106, and 108. Heaters 56 of zone M1, 70A of zone H1, 74A of zone D1, 70B of zone H2, and 74B of zone D2 are also shown in FIG. 3.

Microprocessor 90 communicates over CAN network 54 with display module 50 and module 52B. The operation of modules 52A and 52B is coordinated so that together they provide time sharing while maintaining total current draw at the desired average RMS value, as illustrated by the example shown in Table 2. Module 52B is similar to module 52A shown in FIG. 3, except that module 52B controls power to zones H3, H4, D3, and D4.

Microprocessor 90 receives temperature sensor inputs TH1-TH4 from RTDs 72A-72D shown in FIG. 2. It also receives temperature sensor inputs TD1-TD4 from RTDs 76A-76D of FIG. 2 and temperature sensor input TM1 from RTD 58.

In FIG. 3, the power to heaters and zones M1, H1, and D1 is provided through circuit 110 connected between lines L1 and L2. Power to zones H2 and D2 is provided through circuit 112.

Circuit 110 includes relay 92, current sensor 96, M1 heater 56, and optotriac (OT) 100, H1 heater 70A and optotriac 102, and D1 heater 74A and optotriac 104. Current flows through circuit 110 when relay 92 is closed. Microprocessor 90 controls the state of relay 92 with control signal R1.

Current sensor 96 is connected in series with relay 92, and senses current flowing through circuit 110. Current sense signal CS1 is supplied as an input to microprocessor 90.

Optotriacs 100, 102, and 104 are controlled by microprocessor 90 through control signals OTM1, OTH1, and OTD1, respectively. Power is supplied to heater 56 only when relay R1 is closed and optotriac 100 is triggered at a zero crossing of the electric power. Similarly, hose heater 70A of zone H1 receives power only when relay R1 is closed and optotriac 102 is triggered at a zero crossing. Dispenser heater 74A of zone D1 only receives power when relay R1 is closed and optotriac 104 is triggered at a zero crossing. Power continues for a half cycle. Power will not continue beyond a half cycle unless optotriac 100, 102 or 104 begin triggered at a zero crossing.

Circuit 112 is similar to circuit 110. Relay 94 is connected in series with current sensor 98. Relay 94 is controlled by control signal R2 from microprocessor 90. Current sensor 98 supplies a current sense signal CS2 as an input to microprocessor 90. Heater 70B is connected in series with relay 94, current sensor 98, and optotriac 106. Heater 70B is turned on only when optotriac 106 is triggered by control signal OTH2 at a zero crossing.

Heater 74B of zone D2 is connected in series with relay 94, current sensor 98, and optotriac 108. Power is delivered to heater 74B only when relay 94 is closed and optotriac 108 is triggered at a zero crossing by control signal OTD2 from microprocessor 90.

The power management provided by controller 18 offers a number of advantages. It provides fastest startup time by prioritizing the distribution of power to the heaters in the various zones of the hot melt system. It allows optimal performance on different levels of power service including different voltages, different circuit breakers, and different number of phases. It does not require that all channels be active, and provides enhanced performance when not all channels are active. The ability to operate at different levels of power service and different types of power service allows system 10 or 10A to be used in different locations and different power service without any conversion of hardware. Use of current sensors also allows controller 18 to determine line frequency of the power and whether one or three phase power is present. This allows controller 18 to adapt to different power sources. Maximum output power is maintained even when power supply is below normal voltage. Over draw of current is also prevented when voltage supply is above nominal values, because the distribution of power is based upon current draws of the individual heaters as well as a selected total current draw average based upon the applicable circuit breaker amperage. The power factor of system 10, 10A is maintained as close as possible to one. This results in reduced power service cost because the AC electric power is used in the most efficient manner.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A method of controlling heating of hot melt adhesive within a hot melt dispensing system having heaters in a plurality of zones, the method comprising:

receiving input AC electric power;

determining on a half cycle-by-half cycle basis which heaters will receive AC electric power during the next half cycle; and distributing the AC electric power to the heaters on a time sharing basis, wherein distributing AC electric power to the heaters further includes maintaining an RMS total current draw over time at or below the total current target.

2. The method of claim 1, wherein determining on a half cycle-by-half cycle basis which heaters will receive AC electric power during the next half cycle further includes:

receiving current sense signals indicating each zero crossing of the AC electric power; and selecting which heaters will receive power during that next half cycle.

3. The method of claim 2, wherein AC electric power is turned on or off to the heaters at each zero crossing of the AC electric power.

4. The method of claim 1, wherein distributing the AC electric power to the heaters on a time sharing basis is a function of a total current target, a temperature set point, current draw of each of the heaters, and stored priority criteria.

5. The method of claim 4, wherein the priority criteria include heating priority of the zones and a history of on and off periods for each heater.

6. The method of claim 4, wherein distribution of AC electric power to the heaters is also based on the voltage and number of phases of the AC electric power.

7. The method of claim 4, wherein distribution of AC electric power is also based on sensed temperatures in the zones.

8. The method of claim 6, wherein determination of distribution of AC electric power is independent of sensed temperatures during a warm up period, and determination of distribution of AC electric power is dependent on sensed temperatures during a normal run-time period.

9. The method of claim 1, wherein distributing AC electric power to the heaters further includes limiting the total current draw during each half cycle to less than a circuit breaker current limit.

10. A method of controlling heating of hot melt adhesive within a hot melt dispensing system having heaters in a plurality of zones, the method comprising:

receiving input AC electric power;

determining AC electric power distribution for each next half cycle; and distributing the AC electric power to the heaters on a time sharing basis as a function of a total current target, a temperature set point, current draw of each of the heaters, and stored priority criteria, wherein distributing AC electric power to the heaters further includes:

maintaining an RMS total current draw over time at or below the total current target; and limiting the total current draw during each half cycle to less than a circuit breaker current limit.

11. The method of claim 10, wherein distribution of AC electric power to the heaters is also based on at least one of the group consisting of sensed current, a voltage and number of phases of the AC electric power, and sensed temperatures in the zones.

12. The method of claim 10, further including:

receiving current sense signals indicating each zero crossing of the AC electric power; and turning on or off AC electric power to the heaters at each zero crossing of the AC electric power.

13. The method of claim 10, wherein the priority criteria include heating priority of the zones and a history of on and off periods for each heater.

14. A method of controlling heating of hot melt adhesive within a hot melt dispensing system having heaters in a plurality of zones, the method comprising:

receiving input AC electric power;

distributing the AC electric power to the heaters on a time sharing basis;

maintaining an RMS total current draw over time at or below the total current target; and limiting the total current draw during each half cycle to less than a circuit breaker current limit.

15. The method of claim 14, wherein distributing AC electric power to the heaters further includes:

receiving current sense signals indicating each zero crossing of the AC electric power; an determining distribution of AC electric power for each next half cycle by selecting which heaters will receive AC electric power during that next half cycle.

16. The method of claim 14, wherein AC electric power is turned on or off to the heaters at each zero crossing of the electric power.

17. The method of claim 14, wherein distributing the AC electric power to the heaters is a function of a total current target, a temperature set point, current draw of each of the heaters, and stored priority criteria distribution, including a heating priority of the zones and a history of on and off periods for each heater.

18. The method of claim 17, wherein distribution of AC electric power to the heaters is also based on at least one of the group consisting of sensed current, a voltage and number of phases of the AC electric power, and sensed temperatures in the zones.

* * * * *